United States Patent [19]

Pommier

[11] 4,186,788
[45] Feb. 5, 1980

[54] PNEUMATIC TIRE

[75] Inventor: Jean Pommier, Clermont-Ferrand, France

[73] Assignee: Compagnie Generale des Etablissements Michelin, Clermont-Ferrand, France

[21] Appl. No.: 882,783

[22] Filed: Mar. 2, 1978

[30] Foreign Application Priority Data

Mar. 3, 1977 [FR] France .................. 77 06682

[51] Int. Cl.² .............................................. B10C 11/08
[52] U.S. Cl. ................................ 152/209 B; D12/147
[58] Field of Search .......... 152/209 B, 209 R, 209 D; D12/147, 151

[56] References Cited

U.S. PATENT DOCUMENTS

| | | | |
|---|---|---|---|
| D. 141,437 | 6/1945 | Brunner | D12/147 |
| 2,324,996 | 7/1943 | Coben | 152/209 B |
| 3,603,370 | 9/1971 | Hylbert | 152/209 B |
| 3,844,321 | 10/1974 | Verjier | 152/209 B |
| 4,131,148 | 12/1978 | Bertazzoli et al. | 152/209 B |

*Primary Examiner*—Richard A. Bertsch
*Attorney, Agent, or Firm*—Brumbaugh, Graves, Donohue & Raymond

[57] ABSTRACT

A pneumatic tire particularly useful in agriculture is improved due to the bars of its tread having an average angle of inclination, with respect to the longitudinal plane of symmetry, which is greater at their end adjacent the tread edges than at their other end and walls whose slope on the side of the leading edge of the bar is more abrupt towards the center of the tread than towards the edges of the tread and walls whose slope on the side of the trailing edge is more gentle towards the center of the tread than towards the edges of the tread.

7 Claims, 3 Drawing Figures

PNEUMATIC TIRE

The present invention relates to improvements in treads of tires used for heavy vehicles, particularly in the field of agriculture. In particular, it concerns the shape of the blocks of these treads, known as "bars".

It is known that tires intended primarily for work on soft earth requiring a high driving torque, such as for instance agricultural work, have treads which generally have relatively high bars in order to anchor themselves in the soft earth, they being inclined by about 45° with respect to the longitudinal plane of symmetry of the tire and arranged alternately on one side and the other of said plane, with a certain overlap.

Upon travel on the road, more and more disturbing forms of wear have appeared; the trailing edge of the bars wears down very rapidly; more extensive wear is observed on one bar out of two, in general the bar located on the side of the edge of the road; the general wear of the bars results in a helicoidal shape of the entire tread.

I therefore thought of modifying, on the one hand, the inclination of the bars with respect to the plane of symmetry and, on the other hand, of modifying the slope of their walls, but it was not possible to obtain a satisfactory compromise between adherence to soft earth and resistance to wear.

The present invention makes it possible to obtain bars which afford the twofold advantage of avoiding the present forms of wear and improving their adherence to soft earth.

A tire in accordance with the invention which has a tread having a longitudinal plane of symmetry and two side edges is characterized by the fact that the bars of its tread which extend in circumferential rows each from a different edge of the tread to at least the longitudinal plane of symmetry of the tread have, with respect to the longitudinal plane of symmetry of the tread, an average angle of inclination which is greater at their end adjacent the edge of the tread than at their end located in the region of said plane, and walls whose slope on the side of the leading edge is more abrupt in the region of said plane than in the region of the edges of the tread and walls whose slope on the side of the trailing edge is more gentle in the region of said plane than in the region of the edges of the tread.

The average angle of inclination of the bars with respect to the plane of symmetry of the tread varies between two values of from 45° to 90°, for instance about 46° in the region of the longitudinal plane of symmetry of the tread and about 66° in the region adjacent the edge of the tread.

The abrupt slopes of the walls form an angle of between 0 and 8° with the radial direction.

The gentle slopes of the walls form an angle of between 6° and 20° with the radial direction.

All slope angles are measured in direction of the radially outer face of the bars.

One embodiment of the invention will now be described, by way of illustration and not of limitation, with reference to the accompanying drawing, in which.

Figure 1:
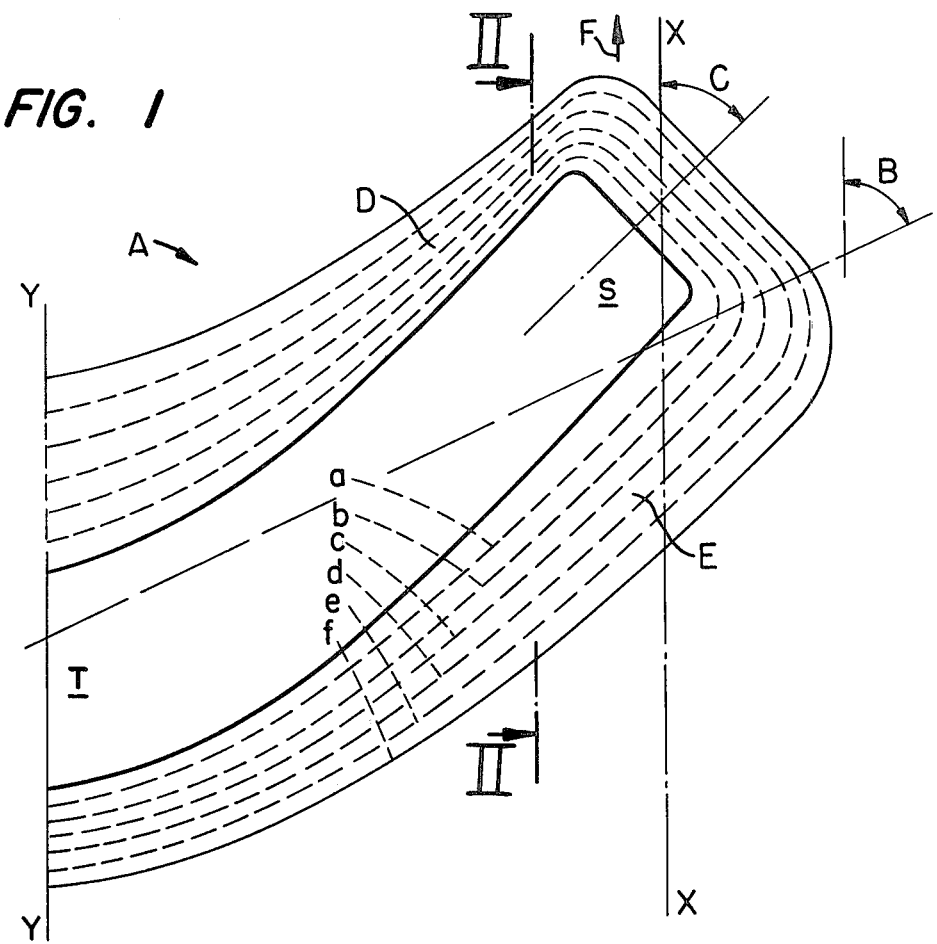
FIG. 1 is a top view of a bar in accordance with the invention.

FIG. 1 shows the trace X—X on the tread of the plane of symmetry of an agricultural tire. The arrow F indicates the customary direction of rotation. A bar A in accordance with the invention has been designed with contour curves a, b, c, d, e and f, whose planes are drawn in FIG. 2. This bar extends from the edge Y—Y of the tread to beyond the longitudinal plane of symmetry X—X of the tread.

In accordance with the invention, the average angle of inclination of the bar A with respect to the plane of symmetry X—X is greater (angle B) at its T end adjacent the edge Y—Y of the tread than (angle C) at its ends adjacent said plane of symmetry. Moreover, the slope of the wall on the side of the leading edge D is more abrupt towards the center X—X of the tread than towards the edge Y—Y of the tread, while on the side of the trailing edge E it is the opposite, namely the wall has a more gentle slope towards the center X—X of the tread than towards the edge Y—Y of the tread.

The values of the various angles mentioned above are, for instance, as follows:

- average angle of inclination: (B) = 66° and (C) = 46°,
- abrupt slope angle $\alpha$: from 0 to 8°         ⎫ with respect
- gentle slope angle $\beta$: from 6 to 20°       ⎬ to the radial
                                                   ⎭ direction R Although in the illustrated example the slope of the walls of each bar A is shown as varying steadily from the region T adjacent the edge Y—Y of the tread to the regions adjacent the longitudinal plane of symmetry X—X of the tread, the invention does not exclude the possibility of said slope varying stepwise between these two regions.

The arrangement in accordance with the invention improves the adherence properties of the new tire and preserves them as the wear progresses; as a matter of fact, the loss of adherence caused by the decrease in height of the bars is compensated for by the increase in their average angle of inclination with respect to the plane of symmetry.

Figure 2:
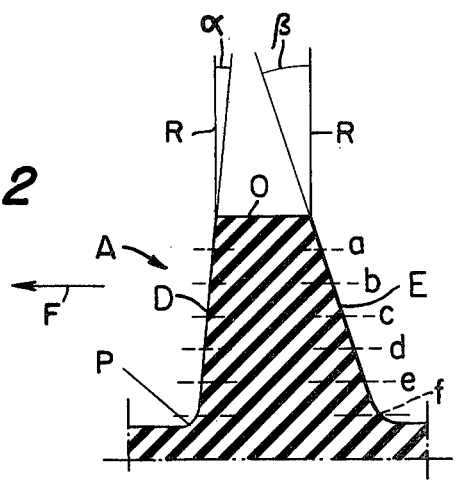
FIG. 2 is a sectional view on a smaller scale along the line II—II of FIG. 1
Figure 3:
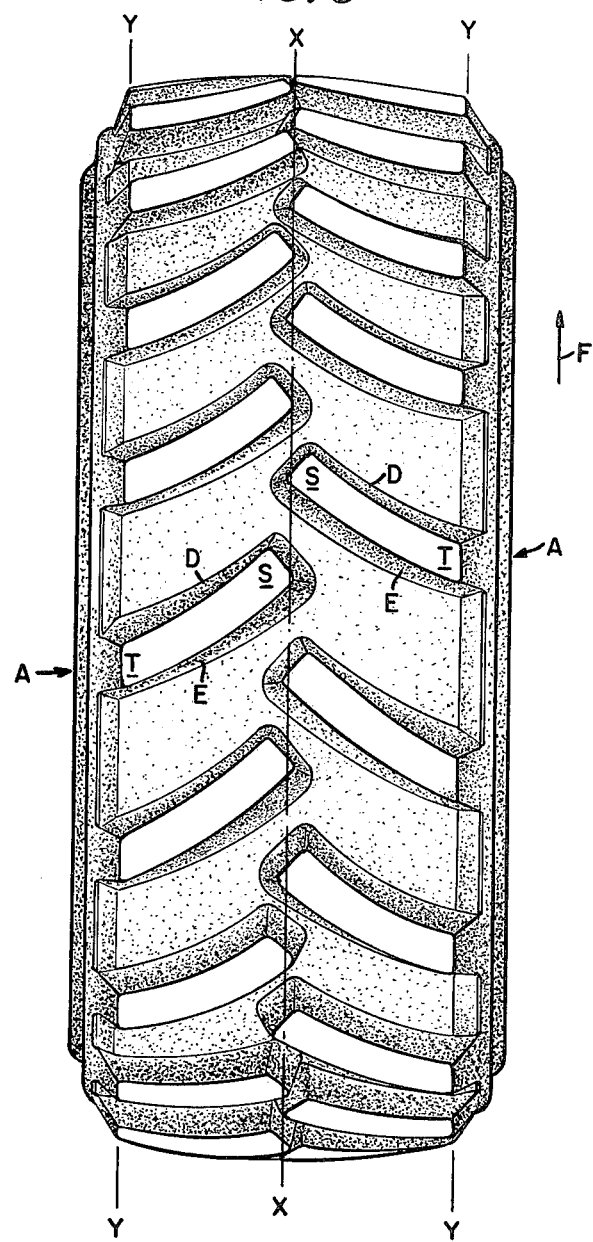
FIG. 3 is a front perspective view of a tire in accordance with the invention.

With respect to the wear, its tendency to accelerate as the average angle of inclination of the bars with respect to the plane of symmetry of the tire increases is counteracted by the progressive increase of the width of the bars, because the bars are wider at their foot P than at their top O (FIG. 2).

Finally, it is noted that the abnormal wear mentioned above disappears, giving way to a uniform wear which lengthens the life of the tires.

What is claimed is:

1. A pneumatic tire having a tread with two side edges, a longitudinal plane of symmetry and traction bars with a leading edge and a trailing edge, said traction bars having, with respect to said longitudinal plane of symmetry, an average angle of inclination which is greater at their end adjacent said side edges than at their end adjacent said longitudinal plane of symmetry, said leading edge having a slope more abrupt in the region of said longitudinal plane of symmetry than in the region of said side edges and said trailing edge having a slope more gentle in the region of said longitudinal plane of symmetry than in the region of said side edges.

2. The pneumatic tire according to claim 1, in which the average angle of inclination of said traction bars with respect to said longitudinal plane of symmetry varies between two values of from 45° to 90°, the value at the end of said traction bars adjacent said longitudinal plane of symmetry being preferably about 46° and the value at the end of said traction bars adjacent said side edges being preferably about 66° C.

3. The pneumatic tire according to claim 1, in which the more abrupt slope forms an angle of between 0° and 8° with the radial direction of the tire.

4. The pneumatic tire according to claim 1, in which the more gentle slope forms an angle of between 6° and 20° with the radial direction of the tire.

5. The pneumatic tire according to claim 1, in which a longitudinal cross-section of said traction bars is wider at its foot than at its top.

6. The pneumatic tire according to claim 1, in which said two slopes vary steadily from the region of said side edges to the region of said longitudinal plane of symmetry.

7. The pneumatic tire according to claim 1, in which said two slopes vary stepwise from the region of said side edges to the region of said longitudinal plane of symmetry.

* * * * *